United States Patent

Krauss et al.

[11] Patent Number: 4,509,074
[45] Date of Patent: Apr. 2, 1985

[54] TELEVISION INSTALLATION COMPRISING A CIRCUIT ARRANGEMENT FOR THE COMPENSATION OF AMPLITUDE VARIATIONS

[75] Inventors: Peter Krauss, Bubenreuth; Jürgen Reinhardt, Aurachtal; Johann Seissl, Erlangen, all of Fed. Rep. of Germany

[73] Assignee: Siemens Aktiengesellschaft, Berlin & Munich, Fed. Rep. of Germany

[21] Appl. No.: 463,485

[22] Filed: Feb. 3, 1983

[30] Foreign Application Priority Data

May 17, 1982 [DE] Fed. Rep. of Germany ....... 3218505

[51] Int. Cl.³ ............................................. H04N 7/18
[52] U.S. Cl. .................... 358/111; 358/168; 364/414; 378/99
[58] Field of Search .............. 358/111, 168, 160; 378/99; 364/414

[56] References Cited

U.S. PATENT DOCUMENTS 4,013,833  3/1977  Zimmerman ...................... 358/168
4,375,068  2/1983  McBride ............................ 358/111
4,473,843  9/1984  Bishop ............................. 358/111

FOREIGN PATENT DOCUMENTS 2007905  11/1970  Fed. Rep. of Germany .

Primary Examiner—Howard W. Britton
Attorney, Agent, or Firm—Hill, Van Santen, Steadman & Simpson

[57] ABSTRACT

A television installation comprising a circuit arrangement for amplification alteration or variation of the video signal in dependence upon its current mean value as compared to a reference mean value. A television camera and monitor are provided, and the current video signal is intermediately stored in an image memory. A mean value is formed in a mean value circuit. This value is compared in relation to a reference value of a reference circuit. A factor is supplied in the form of an output signal of a division stage to a multiplication stage in which the factor is multiplied with the video signal contained in the image memory. The video signal is thereby standardized to a reference value.

6 Claims, 3 Drawing Figures

TELEVISION INSTALLATION COMPRISING A CIRCUIT ARRANGEMENT FOR THE COMPENSATION OF AMPLITUDE VARIATIONS

BACKGROUND OF THE INVENTION

1. Field of the Invention:

The invention relates to a television installation comprising a circuit arrangement for the amplification variation of the video signal in dependence upon its mean value. The installation includes a television camera and a monitor. A circuit of this type serves the purpose of control of the amplification of the video signal in order that the brightness on the monitor exhibits a constant or uniform distribution.

2. Description of the Prior Art:

In German AS No. 20 07 905, incorporated herein by reference, a television installation of the cited type is described in which there is connected after an output of the television camera an amplification control circuit which alters the amplification of the video signal of the television camera. For this purpose, the video signal is removed from a following amplifier and supplied to a circuit for the generation of a control signal which acts on the amplification control circuit for the purpose of influencing the amplification.

In the case of television systems, in particular in the case of X-ray television systems, amplitude variations of the image signal frequently occur. They are based e.g. on a chronological variation of the X-ray dose, on mains voltage variations, on non-constant time behavior of the switching members of the high voltage generator, or on a rising or changing characteristic behavior of the television pickup tube. The amplification control adjustment installed in these television systems cannot prevent the brief picture signal variations since the latter require at least the time of one image or picture period (one vertical frame, for example) for the measured value detection. In addition, the response times of control units and final control elements have a disadvantageous and time-delaying effect on the control adjustment.

SUMMARY OF THE INVENTION

It is an object of the invention to produce a television installation of the type initially cited wherein a control of the amplification proceeds without time losses and visible brightness jumps in the monitor image.

This object is achieved in accordance with the invention in that the current video signal presently occurring is supplied to an image memory and to a standardization circuit which has a mean value circuit for the video signal, a reference circuit for the mean value, a logic element connected thereto for the formation of a standardization value, and a circuit which effects a multiplication of the stored video signal with the standardization value. It is thereby achieved that the television picture is standardized to one value so that the brightness distribution of the monitor image remains constant.

An advantageous embodiment is obtained if the standardization circuit has a division stage connected with outputs of the mean value circuit and reference circuit, and the multiplication stage is connected with the division stage and the output of the image memory. The component usage and hence the costs, can be reduced if there is connected to the television camera a logarithmizer whose output is connected with the image memory and the mean value circuit. The standardization circuit is provided with a subtraction stage connected with the mean value circuit and the reference circuit. The outputs of the subtraction stage and of the image memory are connected to an addition stage whose output signal is supplied to a delogarithmizer.

DESCRIPTION OF THE PREFERRED EMBODIMENTS

Figure 1:
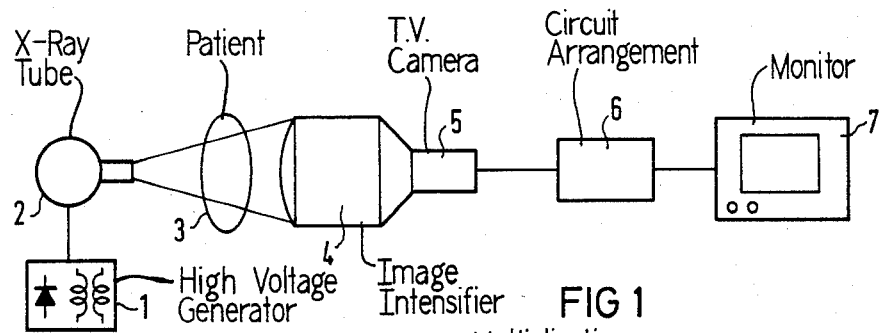
FIG. 1 illustrates an X-ray diagnostic installation for the purpose of explaining the invention concepts.

In FIG. 1 an X-ray diagnostic installation comprising a high voltage generator 1 is illustrated which feeds an X-ray tube 2. The rays emitted by the X-ray tube 2 penetrate a patient 3 and generate a radiation image on the input fluorescent screen of an X-ray image intensifier 4. The image of the output fluorescent screen of the X-ray image intensifier 4 is picked up by a television camera 5. Connected to the television camera 5 is a circuit arrangement 6 which is connected with a monitor 7.

Figure 2:
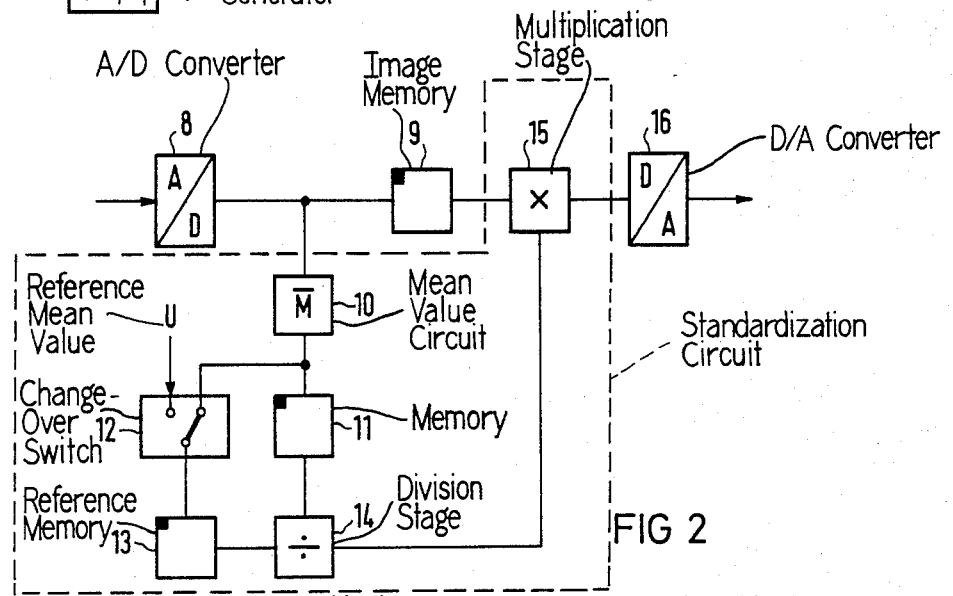
FIG. 2 illustrates a block circuit diagram of the standardization circuit of the X-ray diagnostic installation illustrated in FIG. 1.

In FIG. 2 the circuit arrangement 6 of FIG. 1 is illustrated. The output signal of the television camera 5 is digitized in an analog-to-digital converter (A/D converter 8) and is read into an image memory 9. The output of the A/D converter 8 is likewise connected with a mean value circuit 10 which determines the mean value of the video signal of a television picture. This current or actual mean value is stored in a memory 11 at the end of each picture frame (one vertical frame, for example). Connected to the output of the mean value circuit 10 is a changeover switch device 12 through which a selected mean value can be read into a memory reference 13 as a reference value. For example, there can be supplied to the second input of the changeover switch device 12 an external reference signal which is read into the memory 13. With the memories 11 and 13 a division stage 14 as a logic element is connected which divides the reference value contained in the memory 13 by the current mean value signal contained in the memory 11. The output signal of the division stage 14 is supplied to a multiplication stage 15 in which it is multiplied with the video signal read out from the image memory 9. Following the multiplication stage 15 a digital-to-analog converter (D/A converter 16) is provided which is connected with a monitor 7.

Thus, the current video signal of the television camera 5 is read into the image memory 9. Simultaneously, through the mean value circuit 10, the mean value of the video signal of the entire image is determined, which is stored in the memory 11. A reference value contained in the memory 13 which, for example, was externally input at commencement of a television frame, or was read into the memory as the first mean value, is divided in the division stage 14 by the current mean value of the memory 11. Thus one obtains, for the television picture now entirely contained in the image memory 9, a factor which is multiplied with the video signal in the multiplication stage 15 during readout of the image memroy 9. If the current mean value is equal to the reference value, the factor of one results; i.e., the television picture appears unaltered on the monitor. If, by contrast, the current mean value is smaller than the reference value (the picture is darker), a factor of greater than one results, so that the video signal is amplified by this factor.

Figure 3:
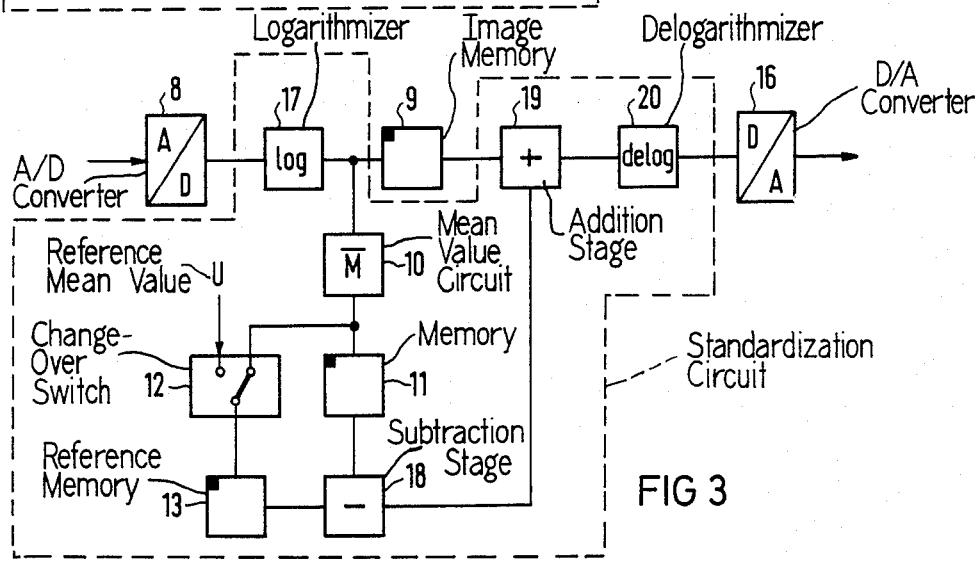
FIG. 3 illustrates a variation of the standardization circuit illustrated in FIG. 1.

In FIG. 3 a variation of the circuit arrangement 6 of FIG. 1 is illustrated. Here, the division and multiplication are effected through a subtraction and addition of logarithmized signals.

The output signal of the television camera 5 is, in turn, supplied to the A/D converter 8 whose output is connected with a logarithmizer 17. The output of the logarithmizer 17 is connected with the image memory 9 and the mean value circuit 10. The latter is connected, in a manner already described, with the memory 11 and the changeover switch device 12 to which the memory 13 is connected. The outputs of the memories 11 and 13 are connected to a subtraction stage 18 which forms the difference of the reference value and the current mean value contained in the memory 11. In an addition stage 19 the output signals of the image memory 9 and of the subtraction stage 18 are added. The output signal of the addition stage 19 is supplied to a delogarithmizer 20 which is connected with the D/A converter 16.

Instead of the digital logarithmizer 17 and the digital delogarithmizer 20, analog circuits can be employed if they are arranged before, or respectively behind, the converters 8, 16. Since logarithmizers and delogarithmizers are already required in the case of the digital image processing methods, for example, in the case of image subtraction, frequently no additional increased expense for these two circuit parts results. Instead, the subtraction stage and addition stage are considerably more simply constructed and operate more rapidly than the division stage and multiplication stage.

All of the circuit blocks described are well known in the art. For example, the mean value circuit can comprise a memory which reads in all horizontal line data of one vertical frame and a computer which calculates an average of all the data for one frame. A vertical sync pulse would then initiate transmission of the current mean value to the division stage and the memory would be prepared for read-in of data for a next vertical frame.

Although various changes and modifications might be proposed by those skilled in the art, it will be understood that we wish to include within the claims of the patent warranted hereon all such changes and modifications as reasonably come within our contribution to the art.

We claim as our invention:

1. A television installation comprising: a television camera producing a video signal; a monitor; circuit means for amplification alteration of the video signal in dependence upon a standardization value; a presently occurring video signal being fed to an image memory and a standardization circuit; and said standardization circuit comprising a mean value circuit means for determining a mean value of a brightness of the presently occurring video signal, a reference means for creating a reference brightness value, and logic element means for comparing the mean value and reference value to create a standardization value for input to the circuit means for alteration.

2. An installation according to claim 1, wherein said circuit means for alteration multiplies a video signal from the image memory by the standardization value.

3. A television installation according to claim 1, wherein the standardization circuit has a division stage connected with outputs of the mean value circuit means and reference means, and the circuit means for alteration comprises a multiplication stage connected with the division stage and the output of the image memory.

4. A television installation according to claim 1, wherein there is connected to the television camera a logarithmizer whose output is connected with the image memory and the mean value circuit means, the standardization circuit having a subtraction stage connected with the mean value circuit means and the reference means, and outputs of the subtraction stage and of the image memory are connected to an addition stage whose output signal is supplied to a delogarithmizer.

5. A television system, comprising: a television camera producing a video signal; an image memory means for receiving the video signal and storing at least one frame thereof; standardization circuit means connected to the video signal for computing a mean value for the current stored frame, for comparing the computed mean value to a reference mean value, and for creating a standardization factor; and means for applying the standardization factor to the stored frame of the video signal when it is output from the image memory means so as to standardize an overall brightness level of the video signal.

6. An X-ray television monitoring installation, comprising: a television camera means for receiving an X-ray image and creating a video signal; monitor means for monitoring the video signal; an analog-to-digital converter connected to receive the video signal from the television camera; an image memory connected to the analog-to-digital converter; brightness standardization means connected at an output of the image memory; a digital-to-analog converter connected at an output of the standardization means before the monitor; mean value circuit means connected between the analog-to-digital converter and image memory for computing a mean value of a stored portion of the video signal in the image memory; means for comparing the mean value to a reference mean value so as to create a standardization factor which is fed to the standardization means.

* * * * *